(12) United States Patent
Zarate et al.

(10) Patent No.: US 10,692,637 B2
(45) Date of Patent: Jun. 23, 2020

(54) ELECTROMAGNETIC ACTUATOR

(71) Applicant: ECOLE POLYTECHNIQUE FEDERALE DE LAUSANNE (EPFL), Lausanne (CH)

(72) Inventors: Juan José Zarate, Neuchâtel (CH); Herbert Shea, Cormondrèche (CH)

(73) Assignee: ECOLE PLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 284 days.

(21) Appl. No.: 15/936,367

(22) Filed: Mar. 26, 2018

(65) Prior Publication Data
US 2018/0277292 A1 Sep. 27, 2018

(30) Foreign Application Priority Data

Mar. 27, 2017 (EP) ..................... 17163181

(51) Int. Cl.
*H01F 7/08* (2006.01)
*H01F 7/18* (2006.01)
(Continued)

(52) U.S. Cl.
CPC .............. *H01F 7/18* (2013.01); *G06F 3/016* (2013.01); *G09B 21/004* (2013.01); *H01F 7/064* (2013.01);
(Continued)

(58) Field of Classification Search
CPC . H01F 7/18; H01F 7/064; H01F 27/28; H01F 27/36; G06F 3/01
(Continued)

(56) References Cited

U.S. PATENT DOCUMENTS 3,781,736 A 12/1973 Parker
4,775,862 A 10/1988 Kent
(Continued)

FOREIGN PATENT DOCUMENTS

DE 30 42 390 A1 6/1982
DE 42 33 524 A1 4/1994
(Continued)

OTHER PUBLICATIONS

Benali-Khoudja, M., et al., "VITAL: An electromagnetic integrated tactile display," ScienceDirect, Displays, vol. 28, pp. 133-144 (2007).
(Continued)

*Primary Examiner* — Shawki S Ismail
*Assistant Examiner* — Lisa N Homza
(74) *Attorney, Agent, or Firm* — Maschoff Brennan

(57) ABSTRACT

The present invention concerns an electromagnetic actuator for a haptic display. The actuator comprises: a) a first, movable permanent magnetic element, the first magnetic element comprising a first latching layer facing side, a second latching layer facing side substantially opposite to the first latching layer facing side, and at least one lateral face between the first latching layer facing side and the second latching layer facing side; b) a shielding element for shielding laterally the first magnetic element to confine a magnetic field generated by the first magnetic element; c) a first actuation inductor facing the first latching layer facing side for actuating the first magnetic element and arranged to displace the first magnetic element from a first latching position to a second latching position, or vice versa; d) a first latching layer facing the first latching layer facing side and arranged to attract the first magnetic element for obtaining the first latching position; and e) a second latching layer facing the second latching layer facing side and arranged to (Continued)

attract the first magnetic element for obtaining the second latching position, different from the first latching position.

13 Claims, 4 Drawing Sheets

(51) Int. Cl.
| | |
|---|---|
| H01F 7/06 | (2006.01) |
| G06F 3/01 | (2006.01) |
| H01F 27/36 | (2006.01) |
| H01F 27/28 | (2006.01) |
| G09B 21/00 | (2006.01) |
| H01F 7/16 | (2006.01) |

(52) U.S. Cl.
CPC ............ *H01F 27/28* (2013.01); *H01F 27/36* (2013.01); *H01F 2007/1669* (2013.01)

(58) Field of Classification Search
USPC ........................................................ 335/229
See application file for complete search history.

(56) References Cited

U.S. PATENT DOCUMENTS

| | | | | |
|---|---|---|---|---|
| 6,137,129 | A * | 10/2000 | Bertin | H01L 27/11 257/135 |
| 6,184,755 | B1 * | 2/2001 | Barber | H01F 17/0006 331/181 |
| 6,617,185 | B1 * | 9/2003 | Geisberger | B81C 1/00126 438/24 |
| 6,786,070 | B1 * | 9/2004 | Dimig | E05B 77/30 292/201 |
| 6,824,739 | B1 * | 11/2004 | Arney | G01N 17/00 204/401 |
| RE42,064 | E | 1/2011 | Fish | |
| 7,924,145 | B2 | 4/2011 | Yuk et al. | |
| 2001/0002329 | A1 * | 5/2001 | Ling | H01L 21/76243 438/459 |
| 2001/0024401 | A1 * | 9/2001 | Short | B01F 5/0413 366/152.1 |
| 2002/0050923 | A1 | 5/2002 | Petersen | |
| 2002/0140050 | A1 * | 10/2002 | Bohlin | H01L 21/823878 257/528 |
| 2004/0004252 | A1 * | 1/2004 | Madurawe | H01L 21/8221 257/347 |
| 2004/0004298 | A1 * | 1/2004 | Madurawe | H01L 27/0688 257/314 |
| 2004/0047546 | A1 * | 3/2004 | Gasparyan | B81B 3/0035 385/18 |
| 2004/0069028 | A1 * | 4/2004 | Dimig | E05B 83/36 70/277 |
| 2004/0125536 | A1 * | 7/2004 | Arney | B81B 3/0086 361/302 |
| 2004/0214389 | A1 * | 10/2004 | Madurawe | G11C 11/412 438/202 |
| 2006/0012576 | A1 | 1/2006 | Hafez et al. | |
| 2006/0143342 | A1 | 6/2006 | Kim et al. | |
| 2006/0243318 | A1 * | 11/2006 | Feldmeier | H02S 40/34 136/244 |
| 2007/0299388 | A1 * | 12/2007 | Chan | A61K 9/0021 604/46 |
| 2008/0182228 | A1 | 7/2008 | Hafez et al. | |
| 2008/0227060 | A1 | 9/2008 | Esashi et al. | |
| 2008/0246737 | A1 | 10/2008 | Benali-Khoudja et al. | |
| 2008/0307786 | A1 | 12/2008 | Hafez et al. | |
| 2012/0056733 | A1 | 3/2012 | Ramsay et al. | |
| 2012/0279845 | A1 * | 11/2012 | Bachman | H03K 17/975 200/600 |
| 2013/0082301 | A1 * | 4/2013 | Onozawa | H01L 29/36 257/139 |
| 2013/0236337 | A1 | 9/2013 | Gummin et al. | |
| 2014/0009411 | A1 | 1/2014 | Cho et al. | |
| 2014/0104047 | A1 | 4/2014 | Bolzmacher et al. | |
| 2014/0184947 | A1 | 7/2014 | Bolzmacher et al. | |
| 2014/0325910 | A1 * | 11/2014 | Faris | A01G 31/06 47/62 R |
| 2015/0317915 | A1 | 11/2015 | Nelson et al. | |
| 2016/0224116 | A1 * | 8/2016 | Hagedorn | G09B 21/003 |
| 2018/0277292 | A1 * | 9/2018 | Zarate | G09B 21/004 |

FOREIGN PATENT DOCUMENTS

| | | |
|---|---|---|
| DE | 103 49 100 A1 | 5/2005 |
| FR | 2 894 061 A1 | 6/2007 |
| GB | 1485 698 A | 9/1977 |
| GB | 1557 001 A | 12/1979 |
| GB | 2466102 A | 6/2010 |
| JP | 2002-351306 A | 12/2002 |
| JP | 2005-055767 A | 3/2005 |
| JP | 2009-123688 A | 6/2009 |
| KR | 10-2013-0091140 A | 8/2013 |
| KR | 10-1626949 B1 | 6/2016 |
| KR | 10-2016-0122491 A | 10/2016 |
| WO | 02/080134 A1 | 10/2002 |
| WO | 2015/039047 A1 | 3/2015 |
| WO | 2015/077846 A1 | 6/2015 |
| WO | 2015/175193 A1 | 11/2015 |
| WO | 2016/198602 A1 | 12/2016 |

OTHER PUBLICATIONS

Gallo, S., et al., "A flexible multimodal tactile display for delivering shape and material information," Sensors and Actuators A: Physical, vol. 236, pp. 180-189 (Dec. 1, 2015).

Strasnick, E., and Follmer, S., "Applications of Switchable Permanent Magnetic Actuators in Shape Change and Tactile Display," Proceeding UIST '16 Adjunct Proceedings of the 29th Annual Symposium on User Interface Software and Technology, pp. 123-125 (Jul. 6, 2016).

Streque, J., et al., "Pulse-driven magnetostatic micro-actuator array based on ultrasoft elastomeric membranes for active surface applications," IOP Publishing Ltd, J. Micromech. Microeng, vol. 22, No. 9, pp. 1-10 (2012).

Szabo, Z., and Enikov, E.T., "Electromagnetic Microactuator-Array Based Virtual Tactile Display," Department of Aerospace and Mechanical Engineering, ICCHP 2016, Part II, LNCS, vol. 9759, pp. 53-60 (Oct. 16, 2016).

Extended European search Report dated Oct. 9, 2017 as received in Application No. 17163181.5.

CH Search Report dated Feb. 9, 2017 as received in Application No. 17-30028.

* cited by examiner

ELECTROMAGNETIC ACTUATOR

TECHNICAL FIELD

The present invention relates to an electromagnetic actuator which may be used for example in a haptic display. More specifically, the electromagnetic actuator according to the present invention is arranged to be magnetically latched in two stable states. The invention also relates to an array of electromagnetic actuators and to a haptic display comprising the array of electromagnetic actuators.

BACKGROUND OF THE INVENTION

Tactile displays, also referred to as haptic displays, are a promising technology to provide visually-impaired people with efficient and autonomous access to graphical information, such as maps and plots, explored using the sense of fine touch of fingertips. The displays are typically the size of a tablet, and able to refresh the graphical information every few seconds. Electromagnetic (EM) actuation has particularly appealing performance in terms of force, deflection, bandwidth, scaling, integration, robustness and portability. Several EM-based tactile display prototypes have been reported using wire-wound coils to attract or repel small permanent magnets.

One of the most challenging obstacles in a densely-packed matrix of EM actuators with strong magnets is to control the magnetic instabilities on the array due to magnet-magnet interactions. If destabilizing forces are comparable to the actuation forces, taxel (movable pin) displacements can no longer be reliably controlled. Only very few strategies are known to address this issue. One approach is to reduce the magnetic volume. While effective, this restricts the applications to very low-force stimuli because the magnetic interaction scales with magnetic volume. Another approach to reduce magnet-magnet interactions is to use immobile soft-magnetic material housings to enclose and guide the magnetic flux. This option adds significant mass, and is not well suited to light and portable devices. It has also been proposed an alternating up/down magnet orientation on the array to partially cancel the static magnetic field. In a further more effective solution, each permanent magnet is placed in a thin ferromagnetic material thus forming a pot-magnet, where only one surface of the magnet (the surface facing a coil) is unshielded. This allows a dense and compact array of EM actuators with the minimum quantity of soft-magnetic material. However, the problem with this approach is that it is only possible to obtain one stable latching position for the permanent magnet.

Another challenge when designing EM actuators is to keep the magnets stable either in their up or down position. It would be desirable to have two stable magnetic positions, i.e. one stable up position and another stable down position. It is to be noted that the problems identified above are not only present in the field of haptic displays, but these problems are equally faced in any field where EM actuators are used.

SUMMARY OF THE INVENTION

It is an object of the present invention to overcome at least some of the problems identified above related to EM actuators.

According to a first aspect of the invention, there is provided an electromagnetic actuator as recited in claim 1.

The proposed new electromagnetic actuator has the advantage that it
a) is able to latch in two stable positions;
b) is able to exert a strong holding force;
c) has substantially no cross-talk;
d) is fast (few ms);
e) enables mm-scale displacement;
f) is compact;
g) is power-efficient; and
h) is scalable to very large arrays.

According to a second aspect of the invention, there is provided an electromagnetic actuator system as recited in claim 10.

According to a third aspect of the invention, there is provided a haptic display as recited in claim 12.

According to a fourth aspect of the invention, there is provided a method of operating the electromagnetic actuator as recited in claim 13.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF AN EMBODIMENT OF THE INVENTION

Figure 1:
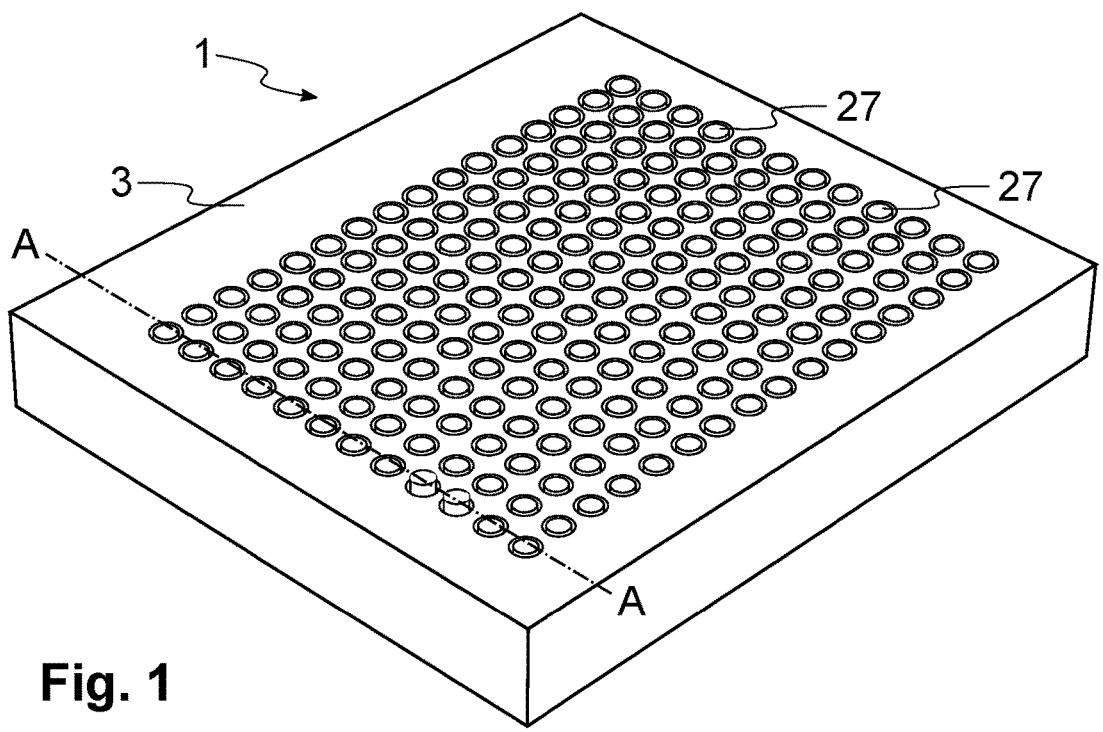
FIG. 1 is a perspective view illustrating a haptic display where an array of electromagnetic actuators according to the present invention can be implemented.

An embodiment of the present invention will now be described in detail with reference to the attached drawings. This non-limiting embodiment is described in the context of a haptic display for blind and visually impaired people. However, the teachings of the present invention are not limited to this environment. The EM actuators according to the present invention may also be applied to a haptic interface for novel human-machine interfaces (e.g. wearables) or to a haptic interface for augmented reality (AR) or virtual reality (VR) applications. Further applications include microfluidic systems where an EM actuator array allows eliminating all the pneumatic pumps, and antenna pointing and beam steering solutions, where the EM actuators can be used for reconfiguring a surface. In the following description identical or corresponding functional and structural elements which appear in the different drawings are assigned the same reference numerals.

Figure 2:
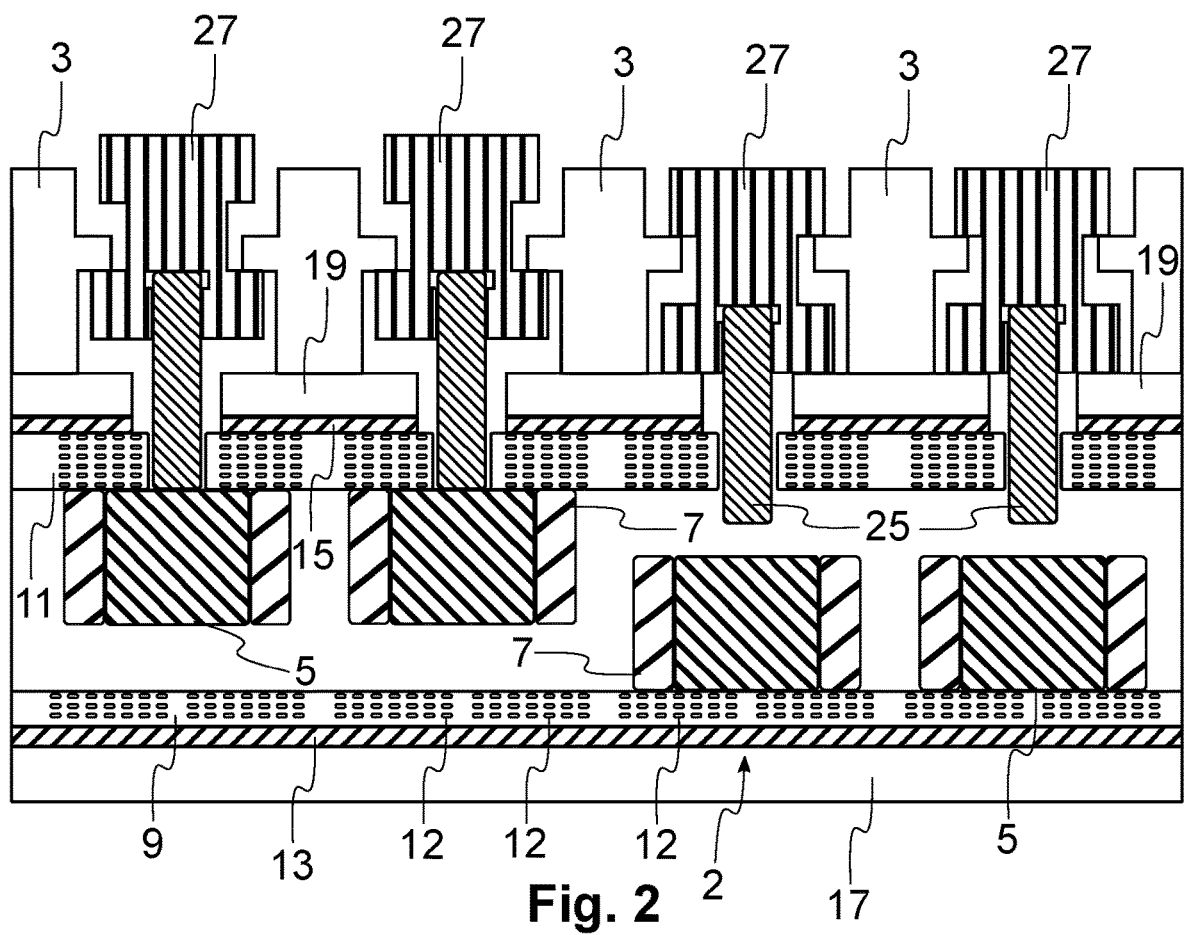
FIG. 2 is a vertical cross-sectional view showing a portion of the array of electromagnetic actuators of FIG. 1.

FIG. 1 is a perspective view showing an EM actuator system 1, which in this example is a haptic display 1, where the teachings of the present invention can be implemented. FIG. 2 is a vertical cross-sectional view of the system 1 through plane A-A in FIG. 1 but showing only the right hand side of the cross-section. It is to be noted that the orientations vertical and horizontal and the positions down or bottom and up or top refer to orientations and/or positions when the system is located on a flat and horizontal surface and in an upright position as it would normally be used. As shown in FIG. 2, the display 1 comprises an array of EM actuators 2, which in this example are arranged to move vertically under a pin array interface 3. In this example, the moving part of a single EM actuator 2 comprises a first magnetic element 5, referred to simply as a first magnet, and a shielding element 7, also referred to as a shield. The first magnet 5 and the shielding element 7 are arranged concentrically, and are arranged to move together when actuated. The shielding element 7 forms a lateral shielding to the first magnet 5 and is in this example attached to it. The first magnet 5 and the shielding element 7 may be glued together for instance. In this example, the shielding element 7 is laterally surrounding the first magnet 5 leaving however the lower or bottom and upper or top surfaces of the first magnet 5 unshielded. In the configuration of FIG. 2, the shielding element 7 is a hollow cylinder so that the first magnet 5 is enclosed by the shielding element 7 and is thus arranged inside the shielding element 7. The first magnet 5 is a permanent magnet. A permanent magnet is an object made from a material that is magnetized and creates its own persistent magnetic field. Materials that can be magnetized, which are also the ones that are strongly attracted to a magnet, are usually ferromagnetic or ferrimagnetic materials. These include for example iron, nickel, cobalt and some alloys of rare-earth metals. It is possible to use an alternating up/down magnet orientation on the array of permanent magnets to partially cancel the static magnetic field generated by the permanent magnets.

As shown in FIG. 2, the first magnet 5 and the shielding element 7 are positioned between a first circuit board 9, also referred to as a bottom or lower circuit board, and a second circuit board 11, also referred to as a top or upper circuit board. The bottom and top circuit boards 9, 11 are in this example printed circuit boards (PCBs) comprising each multilayer planar inductors 12, referred to as coils, which in this example are substantially circular (when seen from above). However, for example square-shaped coils could also be used. In this example, one first magnet 5 has a first coil 12 under it or partially under it and a second coil 12 above it or partially above it. Typically 2-layer to 10-layer planar coils 12, or more specifically 4-layer to 8-layer planar coils 12 are be used. However, it is also possible to use single layer coils instead. Thus, there is no need to have any wire-wound coils laterally surrounding the first magnets 5. In this example, multilayer coils based on PCB technology are used. However, similar planar circuit technologies could be used instead, such as silicon-on-insulator (SOI), Si wafers, low temperature co-fired ceramic (LTCC), high temperature co-fired ceramic (HTCC) etc.

A first latching layer 13, also referred to as a bottom or lower latching layer, is located directly below the bottom circuit board 9 while a second latching layer 15, also referred to as a top or upper latching layer, is located directly above the top circuit board 11. Thus, the bottom latching layer 13 is facing the bottom circuit board 9, while the top latching layer 15 is facing the top circuit board 11. In the present description the action of facing is to be interpreted broadly. This means for instance that when a first element is facing a second element, there can be further elements between the first and second elements or that the first and second elements may be offset with respect to each other. In this example, the bottom and top latching layers 13, 15 are each soft magnetic continuous plates of ferromagnetic material. Soft magnetic materials are those materials that are easily magnetized and demagnetized. In the present description they have intrinsic coercivity less than 1000 $Am^{-1}$. Furthermore, these materials do not have intrinsic polarity and thus no permanent north and south poles as opposed to permanent magnets. In the present example, the bottom and top latching layers 13, 15 are substantially identical and are each of low-carbon steel, i.e. they have 0.05 to 0.25% carbon content by weight. Other metals could be used instead for the bottom and top latching layers 13, 15. The bottom and top latching layers do not have to be identical or substantially identical. For example, different materials and/or thickness may be used to give different latching forces for the bottom and top latching layers 13, 15. The thickness of the latching layers may be between 0.1 mm and 5 mm, or more specifically between 0.3 mm and 3 mm or 0.5 and 1.5 mm. Instead of using latching plates, individual latching elements could be used, optionally having different shapes. According to another variant, the bottom and top latching layers 13, 15 could be permanent magnets. In the present description, the EM actuator is understood to comprise the first magnet 5, the shielding element 7, at least one actuator inductor and the two latching layers 13, 15.

A first heat dissipation layer 17, also referred to as a bottom or lower heat dissipation layer, may be located directly below the bottom latching layer 13 while a second dissipation layer 19, also referred to as a top or upper heat dissipation layer, is located directly above the top latching layer 15. The purpose of these optional heat dissipation layers 17, 19 is to ensure proper cooling of the system 1. In this example, the bottom heat dissipation layer 17 is in fact part of a housing of the system 1. There may further be at least one spacer layer for keeping the circuit boards apart from each other. The spacer layer(s) may advantageously be of light plastic or metallic material. As further shown in FIG. 2, each one of the EM actuators 2 is arranged to cooperate with (in this example to push up) a dowel or peg 25 which may be of metallic material. In this example, these pegs 25 are individually connected by a form-fit connection to a movable pin 27 forming a taxel (tactile element). The taxels 27 may be of plastic material. Each taxel is thus arranged to be urged upwards by one actuator 2, while the taxels 27 are arranged to move downwards by gravity since in the example illustrated in FIG. 2 the pegs 25 are not fixed to the first magnets 5. According to a variant of the present invention, the pegs 25 are attached (e.g. glued) to the first magnets 5 so that they are arranged to move up and down together with the first magnets 5. Furthermore, in the example shown in FIG. 2, the pegs 25 and the taxels 27 are two physically separate elements. However, it would be possible to design them so that they form one single component. The system may also comprise connectors, such as current connectors, to electrically connect the coils 12 in the bottom circuit board 9 with the coils in top circuit board 11.

Figure 3A:
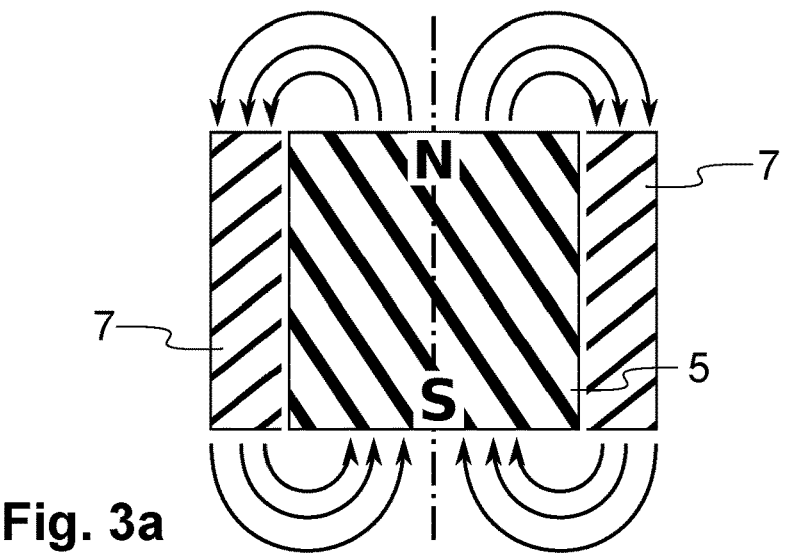
FIGS. 3a to 3c are cross-sectional schematic views showing alternative magnet arrangements according to three examples of the present invention.
Figure 3B:
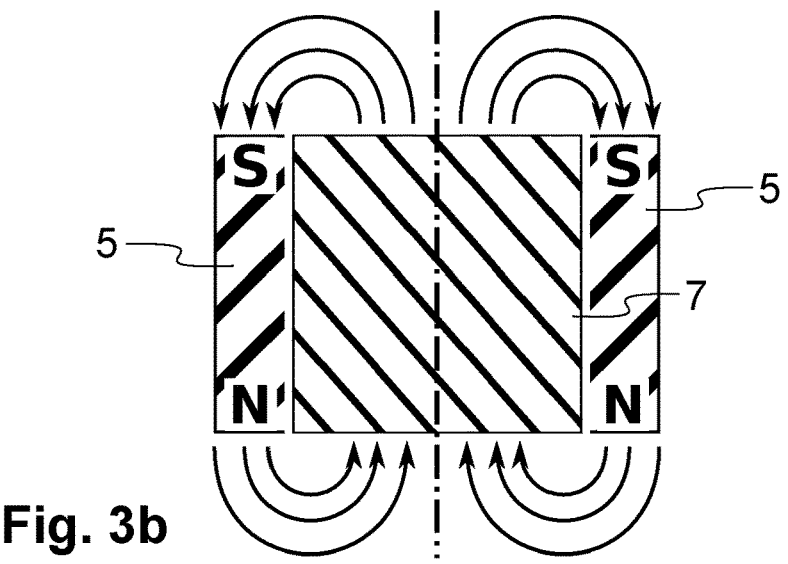
Figure 3C:
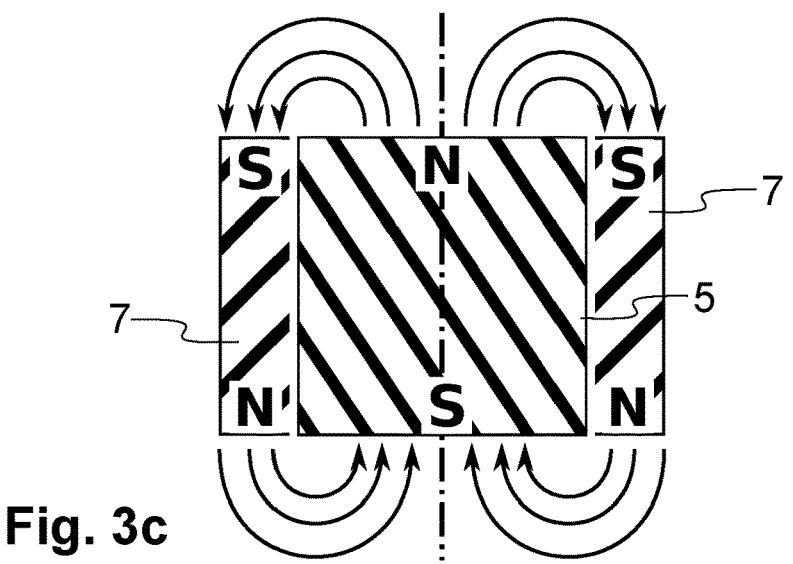

The proposed EM actuators 2 are designed to avoid lateral magnetic crosstalk between neighbor actuators in the actuator array or matrix. This fact allows the assembly of dense arrays of magnetic actuators. FIGS. 3a to 3c show three example magnet configurations formed by two different concentric cylindrical regions. In other words, in all these three configurations, the movable actuator parts are formed by two concentric cylindrical elements. However, the teachings of the present invention are not limited to cylindrical shapes. For example, at least one of the elements could have any other shape, such as cube, hexagonal prism etc. In these examples, at least one element is permanently magnetized (the first magnet 5). The other element has an opposite magnetization direction, due to either soft magnetic material or permanent magnetization. In FIGS. 3a to 3c, the letter "S" refers to the south magnetic pole, while the letter "N" refers to the north magnetic pole. The magnetic field lines outside the cylindrical elements are also shown in FIGS. 3a to 3c. In FIGS. 3a to 3c, the heights of these two magnetic elements are substantially equal. In other words, the bottom surface of the first magnet 5 is substantially flush with the bottom surface of the shielding element 7, while the top surface of the first magnet 5 is substantially flush with the top surface of the shielding element 7. However, this does not have to be the case. For instance, the shielding element 7 could be higher or shorter than the first magnet 5. Furthermore, in the configurations of FIGS. 3a to 3c, the lateral contact interfaces of the first magnet 5 and the shielding element 7 have substantially the same shape such that the first magnet 5 and the shielding element 7 are arranged to be in contact with each other with substantially no space between these elements. However, this does not have to be the case. In other words, the shapes of these two contact interfaces may be different from each other and/or there may be a space between the first magnet 5 and the shielding element 7.

In the configuration of FIG. 3a, the first magnet 5 forms the central cylinder, which is the permanent magnet, and is vertically magnetized (up or down). The element around the first magnet 5 is the shielding element 7 and is an external soft magnetic annular cylinder that itself magnetizes opposite to the first central magnet 5 to enclose the magnetic flux (down or up, respectively). In this configuration the shielding element 7 may be a soft magnet coating. In the configuration of FIG. 3b, the first magnet 5 is the external annular cylinder and is vertically magnetized (up or down). In this configuration the shielding element 7 is an internal soft magnetic cylinder that itself magnetizes opposite to the first annular magnet 5 to enclose the magnetic flux (down or up, respectively). In the configuration of FIG. 3c, the first magnet 5 forms again the central cylinder, and is vertically magnetized (up or down). The shielding element 7 forms the external annular cylinder, which is a second permanent magnet, and is magnetized opposite to the first central magnet 5. In this configuration the shielding element 7 may be a permanent magnet coating. In all these configurations, the first magnet 5 is laterally shielded by either a soft magnetic element (FIGS. 3a and 3b) or by a permanent magnet (FIG. 3c). Two of the surfaces or faces (in this example the bottom and top surfaces) of the first magnet 5 remain unshielded. The effect of the lateral shielding is the focusing of the magnetic field generated by the first magnet 5 in the top and bottom faces, i.e. in the region of the actuation coils. The shielding can be made light weight and thin, and in the above examples it moves attached to the shielded magnet (the first magnet 5). In another variant of the present invention, the shielding element 7 does not move together with the first magnet 5. In this variant the shielding would in fact remain immobile. The horizontal cross-sectional thickness of the shielding element 7 may be between 0.1 mm and 3 mm, and more specifically between 0.2 mm and 1 mm.

When the shielded first magnets 5 are close enough (closer than a given distance threshold which depends on the thickness and/or surface area and/or material of the latching layers) to any of the first and second latching layers 13, 15, they get attracted to the respective latching layer 13, 15 and keep stable in either a first position, also referred to as a down position, or in a second position, also referred to as an up position. Actuator holding forces can be easily tuned during fabrication by changing the thickness and/or material of the latching layer(s) 13, 15. To switch the state of the actuator (i.e. to move the shielded first magnet 5 from the down position to the up position or vice versa), a short pulse of electrical current is driven in the coils 12 of the bottom and top circuit boards 9, 11. Typical current pulses are of 3-30 ms and 2-5 A, or more specifically of 4-15 ms and 3-4 A. A single pulse may be used for single switching (i.e. for single taxel displacement) or vibrating a specific taxel 27. Latching allows keeping the actuator in one of the two stable positions without any power consumption. Electrical current is only used for switching the actuator state. It is to be noted that in many prior art actuators, to keep a magnet in a given state, current is driven for the duration of the latching through the actuator coils 12. There is a tradeoff between having a larger latching force but using higher currents for switching; and both a lower latching force but also less actuation current, hence lower power consumption.

Figure 4A:
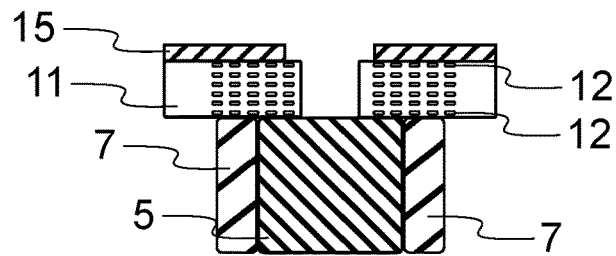
FIGS. 4a to 4d schematically illustrate an electromagnetic actuation cycle according to an example of the present invention.
Figure 4B:
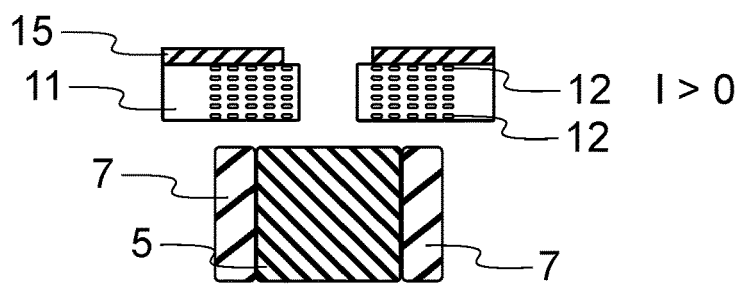
Figure 4C:
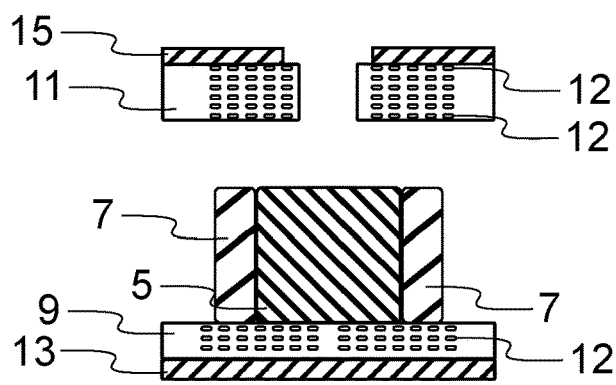
Figure 4D:
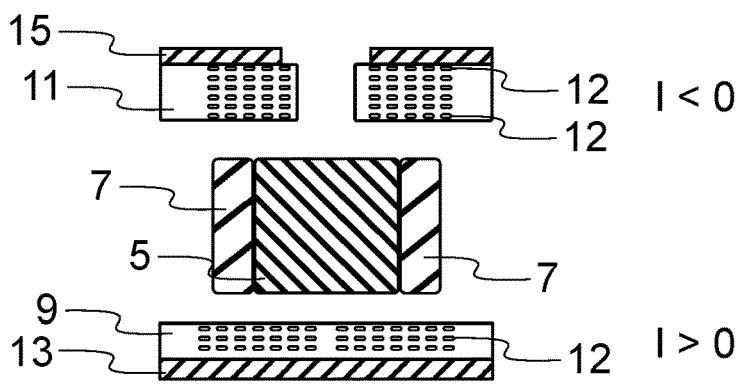

FIGS. 4a to 4d illustrate the EM taxel actuation cycle according to one example. In FIG. 4a, the first magnet 5 is in the up position. In this stable position there is no current through the coils 12. In FIG. 4b, a positive current pulse (current in a first direction) is applied to the coils 12 in the top circuit board 11, while a negative current pulse (current in a second direction), optionally with the same amplitude and/or duration as the positive current pulse, is applied to the coils 12 in the bottom circuit board 9. As shown in FIG. 4b, the first magnet 5 is now in a first intermediate position (which is not a stable position) and is moving from the up position towards the down position. In FIG. 4c, the first magnet 5 has reached the down position and there is no current through the coils 12 at this moment. In FIG. 4d, a negative current pulse is applied to the coils 12 in the top circuit board 11, while a positive current pulse, optionally with the same amplitude and/or duration as the negative current pulse, is applied to the coils 12 in the bottom circuit board 9. As shown in FIG. 4d, the first magnet is now in a second intermediate position (which is not a stable position) and is moving from the down position towards the up position. Thus, when current is applied to the coils 12, a magnetic field is generated such that when the coils 12 in the bottom circuit board 9 attract the first magnet 5, the coils 12 in the top circuit board 11 repel the first magnet and vice versa. It is to be noted that instead of having two layers of coils as explained above, it would be possible to have only one coil layer (i.e. coils only in the bottom or top circuit board). This solution would however be less effective.

Figure 5:
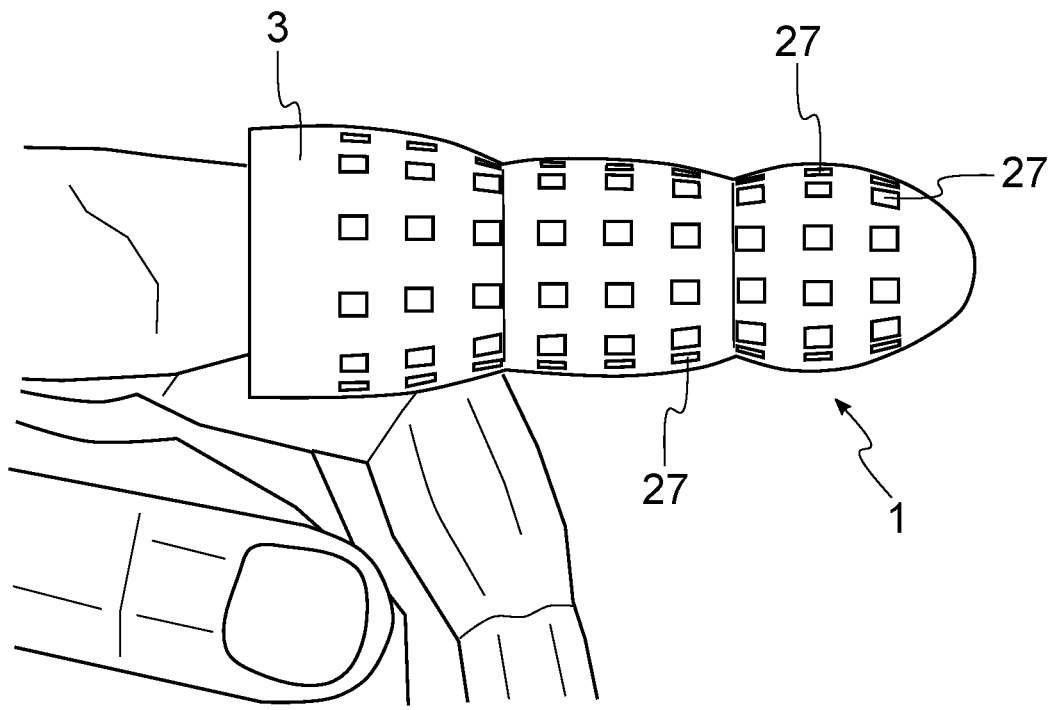
FIG. 5 is a schematic view showing an example application of the array of electromagnetic actuators according to the present invention.

All the parts of a single actuator 2 can be designed to be easily scalable. Instead of using wire-wound coils around the first magnet 5, either rigid or flexible PCB coils 12 are used in the present invention. The latching layers 13, 15 or plates may be thin low-carbon steel shims, which can be machined easily. This is advantageous in production because complexity does not scale up proportionally to the number of taxels. Thus, the surface area of the circuit boards 9, 11 and/or the latching plates 13, 15 may be substantially the same as the horizontal cross-sectional area of the whole system 1. The assembly of each shielded magnet is the only fabrication step that scales up with the number of taxels. However, it can easily be automated by using a pick-and-place machine for example. The above teachings can be used to fabricate either flexible or rigid arrays of actuators. The layer stack can be modified by including flexible circuit boards, spacers, such as silicon spacers, and/or holders to obtain rigid shielded magnets combined with flexible inter-actuation layers as shown in FIG. 5. In this manner, it is possible to obtain for example flexible haptic displays for use in virtual and augmented reality applications for instance.

According to a further variant of the present invention, the EM actuator system 1 as described above may be used to sense inputs received from a user. These inputs may be received by the user pushing down the taxels 27 while the system 1 detects the vertical taxel displacements. More specifically, if a metallic element, such as a magnet moves inside a coil, this generates a voltage which can be detected by a voltage sensor. For this purpose, the pegs 25 may be metallic pegs or have a metallic coating. According to another implementation, the movement of the taxels 27 may be detected by another sensor, which may be located in the pin array interface 3 or elsewhere. According to this variant of the present invention, the system 1 is not only used to generate haptic outputs but also to detect inputs.

Figure 6:
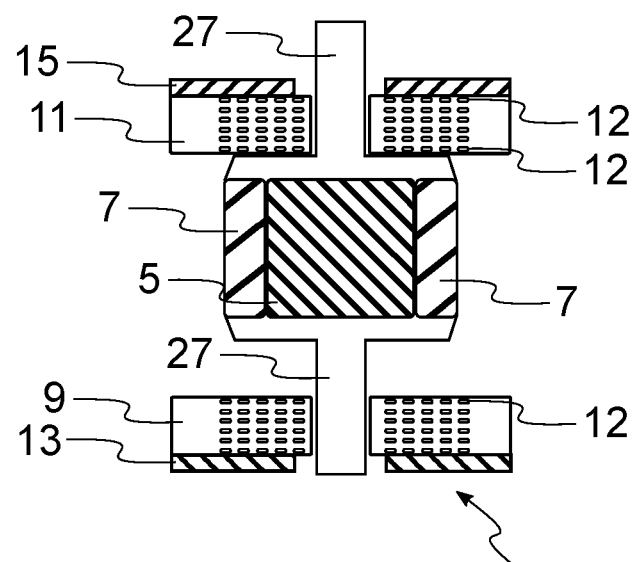
FIG. 6 is a cross-sectional schematic view showing an electromagnetic actuator according to a variant of the present invention.

FIG. 6 illustrates a further variant of the present invention. According to this variant the EM actuator 2 is arranged to generate haptic outputs on two substantially opposing sides or ends of the EM actuator 2. Furthermore, in this example, the taxel 27 also has the functionality of the peg 25 to form one taxel element 27 directly attached to the first magnet 5 and/or the shielding element 7, and more specifically to the ends of the first magnet 5 facing the bottom and top latching layers 13, 15. The taxel element 27 is arranged to be sensed by the user and may be of plastic material. Advantageously the taxel element 27 does not significantly affect the magnetic field of the first magnet 5. Also this variant may be used to generate haptic outputs and to detect inputs.

While the invention has been illustrated and described in detail in the drawings and foregoing description, such illustration and description are to be considered illustrative and not restrictive, the invention being not limited to the disclosed embodiment. Other embodiments and variants are understood, and can be achieved by those skilled in the art when carrying out the claimed invention, based on a study of the drawings, the disclosure and the appended claims. For example, instead of having two unshielded surfaces per actuator, pot-magnets could be used to shield the first magnet 5. In this manner, only one surface (facing one of the circuit boards 9, 11) of the first magnetic element would be unshielded. However, if pot-magnets are used, then the actuators would only have one stable position.

Furthermore, it is to be noted that the order of the layers described above may be different from the order illustrated for instance in FIG. 2. In other words, for example the order of the circuit boards 9, 11 and the latching layers 13, 15 may be interchanged. It is also to be noted that the teachings of the different variants described above may advantageously be combined to obtain further variants.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:
1. An electromagnetic actuator for a haptic display, the actuator comprising:
a first, movable permanent magnetic element, the first magnetic element comprising a first latching layer facing side, a second latching layer facing side substantially opposite to the first latching layer facing side, and at least one lateral face between the first latching layer facing side and the second latching layer facing side;
a shielding element for shielding laterally the first magnetic element to confine a magnetic field generated by the first magnetic element, the first magnetic element and the shielding element being located concentrically with respect to each other;
a first actuation inductor facing the first latching layer facing side for actuating the first magnetic element and arranged to displace the first magnetic element from a first position, referred to hereinafter as a first latching position, to a second position, referred to hereinafter as a second latching position, or vice versa;
a first latching layer facing the first latching layer facing side and arranged to attract the first magnetic element for obtaining the first latching position of the first magnetic element; and
a second latching layer facing the second latching layer facing side and arranged to attract the first magnetic element for obtaining the second latching position of the first magnetic element, different from the first latching position,
wherein the shielding element is arranged to move together with the first magnetic element when the first magnetic element is actuated.

2. The electromagnetic actuator according to claim 1, wherein the actuator further comprises a second actuation inductor facing the second latching layer facing side for actuating the first magnetic element and arranged to displace the first magnetic element from the first latching position to the second latching position, or vice versa.

3. The electromagnetic actuator according to claim 2, wherein the first actuation inductor is located in a first circuit board located between the first magnetic element and the first latching layer, while the second actuation inductor is located in a second circuit board located between the first magnetic element and the second latching layer.

4. The electromagnetic actuator according to claim 1, wherein the first and/or second actuator inductors are planar single layer or multilayer coils.

5. The electromagnetic actuator according to claim 1, wherein the shielding element comprises soft magnetic material and is located laterally around the first magnetic element.

6. The electromagnetic actuator according to claim 1, wherein shielding element comprises a permanent magnet and is located laterally around the first magnetic element, and wherein the first magnetic element and the shielding element have opposite magnetic polarizations.

7. The electromagnetic actuator according to claim 1, wherein the shielding element comprises soft magnetic material and is arranged to be laterally enclosed by the first magnetic element.

8. The electromagnetic actuator according to claim 1, wherein the first latching layer and/or the second latching layer comprise(s) soft magnetic material or permanent magnetic material.

9. The electromagnetic actuator according to claim 1, wherein the height of the first magnetic element is substantially the same as the height of the shielding element.

10. An electromagnetic actuator system comprising the electromagnetic actuator according to claim 1 and further comprising a pin connected to the first magnetic element and arranged to be displaced by the first magnetic element when the first magnetic element is actuated such that the pin is arranged to protrude from a surface to allow it to be tactually sensed by a user of the system.

11. The electromagnetic actuator system according to claim 10, wherein the system further comprises a sensor for measuring an input from the user when the user is urging the pin.

12. A haptic display comprising:
  the electromagnetic actuator system according to claim 10; and
  an array of said electromagnetic actuators.

13. A method of operating the electromagnetic actuator according to claim 1, wherein the method comprises:
  feeding a current pulse through the first actuation inductor for displacing the first magnetic element from the first latching position to the second latching position or vice versa; and
  cutting off the current consumption for a latching duration when the first magnetic element has reached the first or second latching position.

* * * * *